United States Patent
Bagna et al.

[11] Patent Number: 5,940,261
[45] Date of Patent: Aug. 17, 1999

[54] CIRCUIT AND METHOD INDEPENDENT OF FREQUENCY AND VOLTAGE DEVIATIONS OF SUPPLY VOLTAGE, AND DISPLAY APPARATUS INCORPORATING SAME CIRCUIT

[75] Inventors: Marco Bagna, Cesate; Carlo M. Negretti, Milan, both of Israel

[73] Assignee: U.S. Philips Corporation, New York, N.Y.

[21] Appl. No.: 09/025,373

[22] Filed: Feb. 18, 1998

[30] Foreign Application Priority Data

Jun. 25, 1997 [EP] European Pat. Off. .............. 97201942

[51] Int. Cl.$^6$ ....................................................... H04N 9/29
[52] U.S. Cl. .................................................. 361/150; 315/8
[58] Field of Search ..................................... 361/149, 150, 361/267, 139; 335/284; 315/8, 364, 408, 1

[56] References Cited

U.S. PATENT DOCUMENTS

| | | | |
|---|---|---|---|
| 4,262,232 | 4/1981 | Willis | 315/8 |
| 4,636,911 | 1/1987 | Truskalo | 361/150 |
| 4,742,270 | 5/1988 | Fernsler et al. | 315/8 |
| 5,307,232 | 4/1994 | Manske | 361/150 |
| 5,357,398 | 10/1994 | Kamijoh | 361/267 |
| 5,442,515 | 8/1995 | Wallaert | 361/187 |

FOREIGN PATENT DOCUMENTS

| | | | |
|---|---|---|---|
| 0477399A1 | 4/1992 | European Pat. Off. | H04N 9/29 |
| 0598267A2 | 5/1994 | European Pat. Off. | H04N 5/63 |
| 3831306A1 | 3/1990 | Germany | H04N 9/29 |

*Primary Examiner*—Jeffrey Gaffin
*Assistant Examiner*—Kim Huynh
*Attorney, Agent, or Firm*—John C. Fox

[57] ABSTRACT

A degaussing circuit includes an AC mains voltage, a series arrangement of a degaussing coil (Ld) and a switching element (S1) coupled between the input terminals (it1,it2). A measuring circuit (3) continuously measures a value (Ms) representing an actual value of either the degaussing current (Id) through the degaussing coil (Ld) or the AC mains voltage (Vac). A detecting circuit (2) detects a level crossing instant (ts) at which the actual value (Ms) crosses a predetermined value (Vref2). A control circuit (1) determines a switching instant (tei,tstv) of the switching element (S1) in response to the level crossing instant (ts) for generating a peak value of the degaussing current (Id) related to the actual value of the degaussing current (Id) or the AC mains voltage (Vac) at the level crossing instant (ts).

11 Claims, 5 Drawing Sheets

CIRCUIT AND METHOD INDEPENDENT OF FREQUENCY AND VOLTAGE DEVIATIONS OF SUPPLY VOLTAGE, AND DISPLAY APPARATUS INCORPORATING SAME CIRCUIT

BACKGROUND OF THE INVENTION

The invention relates to a degaussing circuit. The invention also relates to a display apparatus comprising such a degaussing circuit. The invention further relates to a method of degaussing.

Any kind of computer monitor or television apparatus with a colour cathode ray tube (further referred to as CRT) requires a degaussing operation. The degaussing operation minimizes residual magnetic fields in magnetisable parts (for example iron brackets) in or near the CRT. Residual magnetic fields would influence the deflection of the electron beams in the CRT, thereby causing discoloration or wrong colours in information displayed. A degaussing action is performed by generating an AC current through a degaussing coil which is positioned near the CRT. This AC current causes magnetic dipoles in the magnetisable parts to follow the orientation of the magnetic field introduced by the degaussing coil. The number of dipoles which become oriented depends on the intensity of the magnetic field. With a progressive reduction of the absolute value of the AC current, fewer and fewer magnetic dipoles become equally oriented. And finally, when the AC current is reduced to zero, the magnetisable parts are demagnetized.

In a known and cheap way to obtain an AC current with a slowly decreasing amplitude, the AC mains voltage is supplied to a series arrangement of a degaussing coil and a PTC resistor. When the display apparatus is switched on, the PTC resistor is cold and thus has a low resistance. A high inrush of AC current flows through the degaussing coil. The PTC is gradually heated by the AC current, consequently, its resistance gradually increases, and the amplitude of the AC current gradually decreases. Such a degaussing circuit has the drawback that the degaussing action cannot be performed frequently. The PTC resistor has to cool down before a next degaussing action is effective.

DE-A-38.31.306 discloses a degaussing circuit which overcomes this problem. The disclosed degaussing circuit comprises a series arrangement of a degaussing coil and a triac. The series arrangement is coupled to receive an AC mains voltage. A sawtooth voltage is generated during a second half of each half period of the AC mains voltage. A start instant of each sawtooth voltage is generated by detecting a zero crossing of a 90° phase-shifted AC mains voltage. An end instant of each sawtooth voltage is generated by detecting a successive zero crossing of the non-shifted AC mains voltage. The sawtooth voltage is compared with an increasing reference voltage to obtain a control pulse for the triac. The control pulse switches the triac on at the instant the sawtooth voltage crosses the reference level. The triac switches off automatically at the next zero crossing of the AC mains voltage, because then the degaussing current is zero too. The on-time of the triac slowly decreases in successive half periods of the AC mains voltage as the reference level slowly increases. At the start of a degaussing action, a start value of the reference voltage is increased if an amplitude of the AC mains voltage is increased for obtaining a smaller on-time of the triac at the start of the degaussing action.

The disclosed degaussing circuit only compensates for slow amplitude changes of the AC mains voltage. The known degaussing circuit does not compensate for mains frequency deviations or irregularities of the AC mains voltage. Examples of irregularities are fast changing amplitudes such as mains spikes and mains dips, or asymmetrical distortions causing successive half mains periods to have different durations and/or amplitudes.

OBJECTS AND SUMMARY OF THE INVENTION

It is an object of the invention to provide a degaussing circuit with an improved performance with respect to mains frequency deviations and irregularities of the mains voltage.

To this end, a first aspect of the invention provides a degaussing circuit. A second aspect of the invention provides a display apparatus comprising such a degaussing circuit. A third aspect of the invention provides a method of degaussing.

Advantageous embodiments are defined in the dependent claims.

The degaussing circuit according to the invention comprises a measuring circuit for continuously measuring the actual value of either the degaussing current through the degaussing coil or the AC mains voltage to obtain a measurement value related to the actual value. A detecting circuit detects a level crossing instant at which the measurement value crosses a predetermined value. The control circuit determines a switching instant of the switching element arranged in series with the degaussing coil in response to said level crossing instant.

In a first situation, wherein the (AC) degaussing current through the degaussing coil is measured, a level crossing instant at which this degaussing current has a certain predetermined value can easily be detected, for example by means of a comparator which compares a voltage related to the degaussing current with a reference voltage. If the switching element is closed at this level crossing instant, a degaussing current will flow with an amplitude depending on the predetermined value. The switching element may be closed for a short on-period starting at the level crossing instant. In a preferred embodiment of the invention, the on-period of the switching element starts at the zero crossing of the AC mains voltage and ends at the level crossing instant. In this way, the switching element is switched on with minimal losses as the voltage across the switching element is very low.

In a second situation, wherein the AC mains voltage is measured, a level crossing instant at which the AC mains voltage has a certain predetermined value is determined. At this level crossing instant, the degaussing current through the degaussing coil has a predetermined value which depends on the AC mains voltage and the resistance of the degaussing coil. It is assumed that the inductance of the degaussing coil is negligible at the mains frequency. So, if the switching element is closed at the level crossing instant, a degaussing current will flow with an amplitude depending on the predetermined value. If the level crossing instant is determined by measuring the AC mains voltage during the rising edge of a half period with positive polarity (or the falling edge of the half period with negative polarity), the on-period must be short. In a preferred embodiment of the invention, the level crossing instant is determined during the falling edge of the half period with positive polarity (or the rising edge of the half period with negative polarity). The on-period starts at the level crossing instant and may last until a zero crossing of the AC mains voltage.

In an embodiment of the invention, either the measurement value (in the claims referred to as said value) or the predetermined value is influenced to change in response to the time elapsed since the start of a degaussing action. In this way, the level crossing instant is controlled so as to gradually (slow with respect to the period duration of the AC mains voltage) lower the amplitude of the degaussing current. In the second situation, the measurement value may be compared with a predetermined value or voltage which decreases in time. Let us assume that, the level crossing instant is determined during the falling edge of the half period with positive polarity. Then, the level crossing instant may be determined by detecting with a comparator the instant the measurement value rises above the predetermined value. The slowly decreasing predetermined value causes the amplitude of the degaussing current to decrease slowly, because the predetermined value is a measure of the amplitude of the degaussing current. In the same way, it is possible to add a slowly increasing signal to the measurement value and compare this combined signal with a constant predetermined value. A similar reasoning holds for the first situation. This is elucidated in the description of the FIGS. 2 and 3.

In an embodiment of the invention, a rectified mains voltage is generated. This enables the switching element to be of a cheap single-direction conductivity type, such as a thyristor. A thyristor has the further advantage that it switches off automatically if the current through it becomes zero. This simplifies the control circuit.

In an embodiment of the invention, a circuit provides a simple means for measuring the current flowing through the degaussing coil.

In an embodiment of the invention, a further switching element is coupled across the degaussing coil. In the first situation, the first-mentioned switching element opens while a non-zero degaussing current flows. By closing the further switching element at or soon after the zero crossing instant at which the first-mentioned switching element is opened, the current in the degaussing coil immediately starts to decrease, without causing high voltages in the degaussing circuit and without high dissipation.

In an embodiment of the invention, the further switching element is controlled so as to switch on in response to the voltage across the degaussing coil. Without any precautions, a steep voltage rise would occur across the degaussing coil at the instant the first-mentioned switching element opens. This voltage is used to switch on the further switching element. A very simple control circuit suffices. It would be possible to drive the further switching element from the control circuit which also drives the first-mentioned switch, but this is more complicated because a large voltage difference may occur between control electrodes of the first-mentioned and the further switching element.

These and other aspects of the invention will be apparent from and elucidated with reference to the accompanying drawings.

DESCRIPTION OF THE PREFERRED EMBODIMENTS

Figure 1:
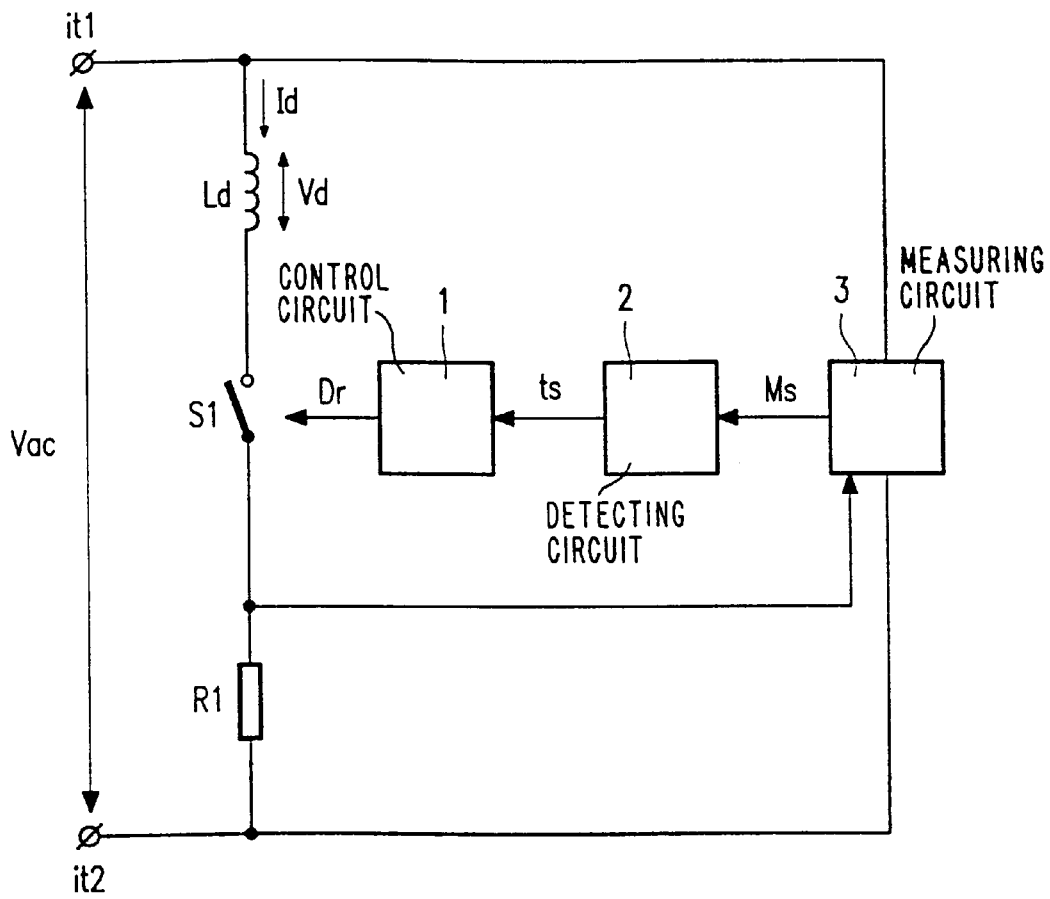
FIG. 1 shows a basic circuit diagram of a degaussing circuit according to the invention.

FIG. 1 shows a basic circuit diagram of a degaussing circuit according to the invention. A series arrangement of a degaussing coil Ld, a switching element S1, and a resistor R1 is connected across input terminals it1,it2 of the degaussing circuit to receive an AC mains voltage Vac. A measuring circuit 3 receives the AC mains voltage Vac and/or a voltage across the resistor R1 to supply a measurement signal Ms to a detecting circuit 2. The measurement circuit 3 continuously measures the actual value of the AC mains voltage Vac or the voltage across the resistor R1. The measurement signal Ms may be a tapped AC mains voltage or the voltage across the resistor R1, which last mentioned voltage is a measure of the degaussing current Id flowing through the degaussing coil Ld. The resistor R1 can be omitted if the measurement circuit 3 measures the AC mains voltage Vac. The measurement circuit 3 may also measure a rectified AC mains voltage Vr (see FIG. 4) instead of the AC mains voltage Vac.

The detecting circuit 2 generates an internal reference level Vref2, and compares the measurement signal Ms with the reference level Vref2. The reference level Vref2 may vary in accordance with the time elapsed since the start of the degaussing operation. It is also possible to use a fixed reference level Vref2, and to add a varying signal, which varies in accordance with the time elapsed since the start of the degaussing operation, to the measurement signal Ms. The comparison performed by the detecting circuit 2 results in an output signal indicating the instant ts at which the measurement signal Ms crosses the varying reference level Vref2, or the instant ts at which the combination of the measurement signal Ms and the varying signal crosses the fixed reference level Vref2. A control circuit 1 supplies drive pulses Dr to the switching element S1 to close the switching element S1 during an on-period. The on-period is determined with respect to the instant ts, as is explained in detail in the description of the next Figs. A voltage across the degaussing coil Ld is denoted by Vd.

Figure 2:
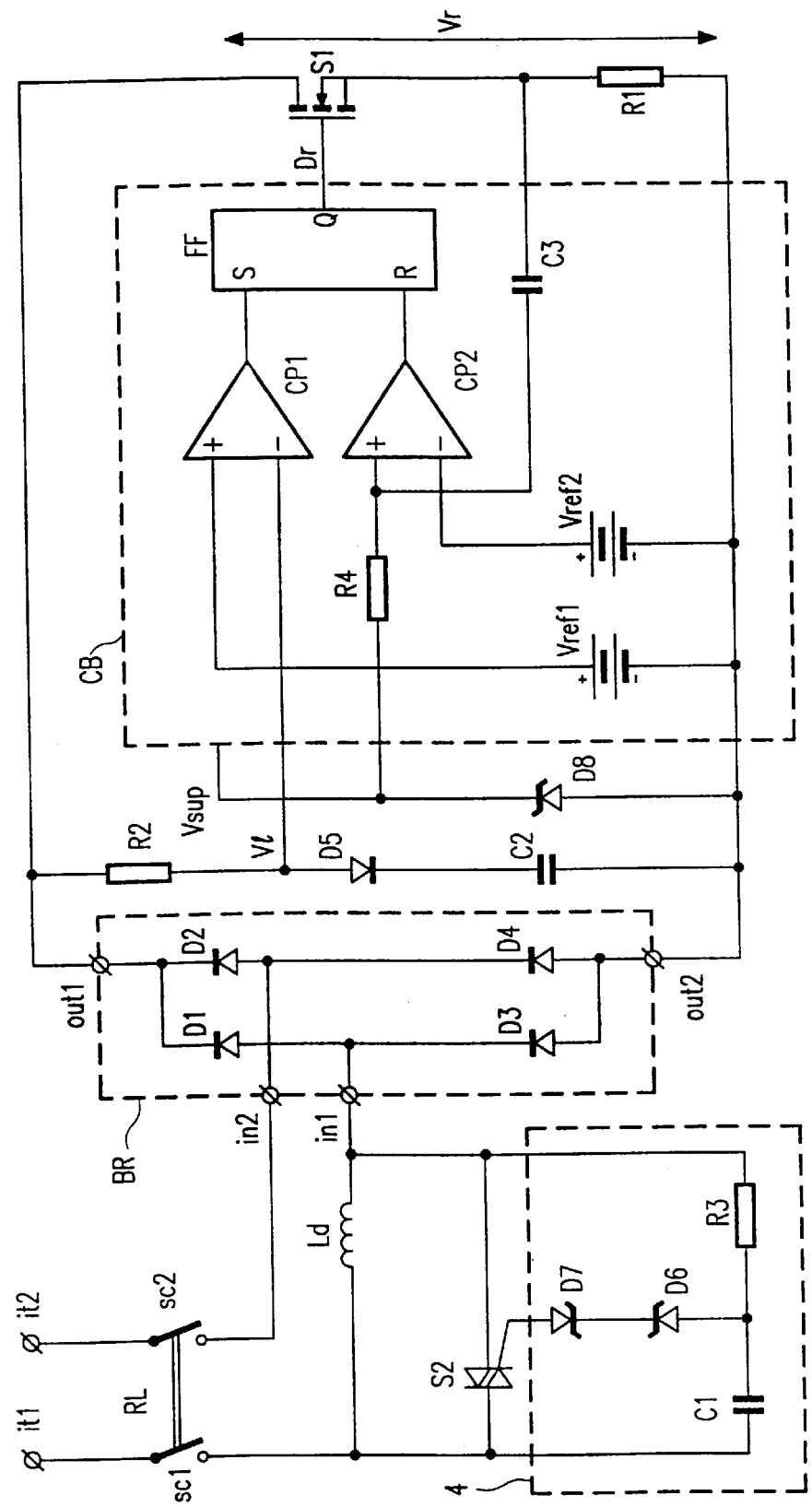
FIG. 2 shows a detailed circuit diagram of a degaussing circuit according to the invention, whereby the degaussing current is measured.

FIG. 2 shows a detailed circuit diagram of a degaussing circuit according to the invention, whereby the degaussing current Id is measured.

The degaussing circuit has a first and a second input it1, it2 for receiving an AC-mains voltage Vac. A first input in1 of a bridge rectifier BR is connected to the first input it1 via a series arrangement of a first switching contact sc1 of a relay RL and the degaussing coil Ld. A second input in2 of the bridge rectifier BR is connected to the second input it2 via a second switching contact sc2 of the relay RL. The bridge rectifier BR comprises diodes D1 to D4. The bridge rectifier has a first and a second output out1, out2 to supply a rectified AC mains voltage Vr. A series arrangement of a main current path of a first switching element S1 and a resistor R1 is connected between the first output out1 and the second output out2 of the bridge rectifier BR. The first switching element S1 is shown as a power Mosfet. Alternatively, an IGBT (Insulated Gate Bipolar Transistor), a GTO (Gate Turn Off transistor) or a BJT (Bipolar Junction Transistor) may be used. Adaptation of the base or gate drive could be necessary. Further, a series arrangement of a resistor R2, a diode D5, and a zener diode D8 is connected between the first output out1 and the second output out2 of the bridge rectifier BR. A smoothing capacitor C2 is connected in parallel with the zener diode D8. A supply voltage Vsup is available at the junction of the diode D5 and the zener diode D8. At a junction of the resistor R2 and the diode D5 a voltage V1 is generated which is the rectified mains voltage clamped by the diode D5 and the zener diode D8. A first comparator CP1 has an inverting input to receive the voltage V1, a non-inverting input connected to a first reference voltage source Vref1, and an output connected to a set input S of a flip flop FF. A second comparator CP2 has an inverting input connected to a second reference voltage source Vref2, a non-inverting input to receive the supply voltage Vsup via a resistor R4, and an output connected to a reset input R of the flip flop FF. The non-inverting input of the second comparator CP2 is further connected to a junction of the main current path of the first switching element S1 and the resistor R1 via a capacitor C3. An output Q of the flip flop FF supplies a drive signal Dr to a control input of the first switching element S1. The control circuit 1 of FIG. 1 comprises the first comparator CP1, the first reference voltage source Vref1, and the flip flop FF. The detecting circuit 2 comprises the second comparator CP2 and the second reference voltage source Vref2. The measuring circuit 3 comprises the capacitor C3. A control block CB comprises the control circuit 1, the detecting circuit 2, and the measuring circuit 3.

A main current path of a second switching element S2 is connected in parallel with the degaussing coil Ld. Further, a series arrangement of a capacitor C1 and a resistor R3 is connected in parallel with the degaussing coil Ld. A series arrangement of two zener diodes D7, D6 is connected between a control input of the second switching element S2 and a junction of the capacitor C1 and the resistor R3. The second switching element S2 may be a triac as shown in FIG. 2. The second switching element S2 may also comprise a unidirectional switching element such as a Mosfet, a bipolar transistor, a thyristor, or an IGBT, arranged in series with a bridge rectifier. Inputs of the bridge rectifier are connected in parallel with the degaussing coil Ld, and the main current path of the unidirectional switching element is connected between outputs of the bridge rectifier.

Figure 3:
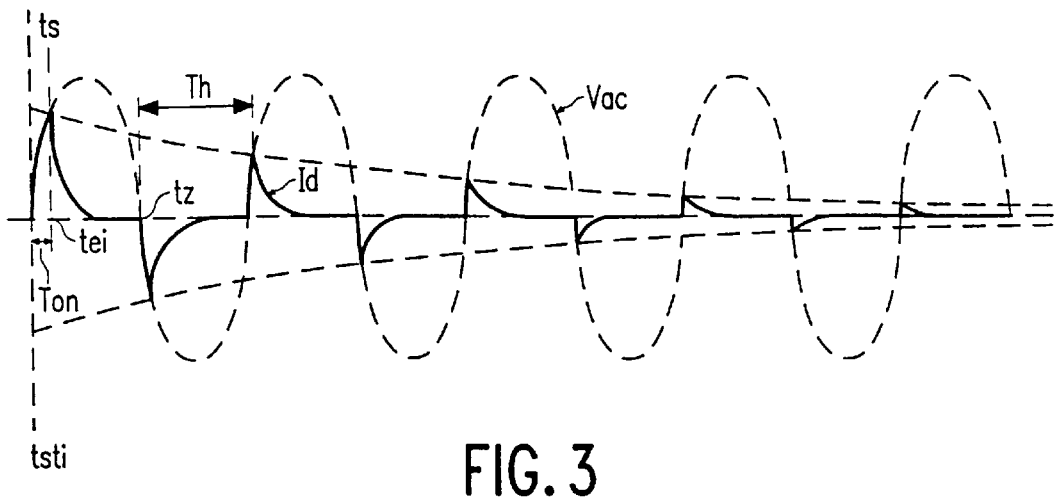
FIG. 3 shows waveforms for explaining the operation of the circuit diagram of FIG. 2.

FIG. 3 shows waveforms for explaining the operation of the circuit diagram of FIG. 2. The dotted sinusoidal waveform represents the AC mains voltage Vac, the dashed lines represent a signal varying in accordance with the time elapsed since the start of a degaussing operation, and the thick line represents the degaussing current Id through the degaussing coil Ld.

The degaussing circuit is activated by closing the first and second switching contacts sc1, sc2 of the relay RL. The rectified AC mains voltage Vr is available across the main current path of the non-conductive Mosfet S1. A small current (a few mA) flows through the resistor R2 to charge the capacitor C2 up to the zener voltage of the zener diode D8 to obtain the supply voltage Vsup for the control block CB. The control block CB is activated when the supply voltage Vsup reaches a suitable value.

The first comparator CP1 compares the clamped rectified AC mains voltage V1 with the first reference voltage Vref1. When the AC mains voltage Vac approaches its zero value at an end of a halve AC mains period Th, the voltage V1 crosses the (low) first reference voltage Vref1 and a positive edge is applied to the set input S of the flip flop FF. The output Q of the flip flop FF is set at a high level and the Mosfet S1 is turned on. Due to some delay, the degaussing current Id through the Mosfet S1 and the degaussing coil Ld starts flowing at or near a zero crossing instant tz of the next half AC mains period Th. In the now following it is assumed that the AC mains voltage Vac has a positive polarity during this next half mains period Th.

Due to the increasing AC mains voltage Vac, the degaussing current Id through the degaussing coil Ld and the Mosfet S1 increases according to Id=Vac/Rd, wherein Rd is the resistance of the degaussing coil Ld. The effect of the inductance Ld of the degaussing coil Ld is negligible at the slow variation in time of the AC mains voltage Vac. The degaussing current Id also flows through the resistor R1 which acts as a current-sensing element. The voltage across the resistor R1 is supplied to the non-inverting input of the second comparator CP2 via the capacitor C3. When the voltage at the non-inverting input of the second comparator CP2 crosses the second reference voltage Vref2, a positive edge is supplied to the reset input R of the flip flop FF. The output Q of the flip flop FF is set at a low level, and the Mosfet S1 is turned off.

As the Mosfet S1 is opened while current is flowing, the voltage across the degaussing coil Ld increases sharply. This high voltage is supplied to the control electrode of the second switching element S2 (FIG. 2 shows a triac) via the capacitor C1, the resistor R3, and the zener diodes D6 and D7, and the triac S2 is turned on. The degaussing coil Ld is short-circuited and the degaussing current Id decays with a time constant T=Ld/Rd. The triac S2 opens when the degaussing current Id through the degaussing coil Ld reaches zero. Now, the degaussing circuit is ready for a next hal AC mains period Th. The degaussing coil Ld must have an inductance Ld which is selected such that the time constant T is short enough to obtain a zero degaussing current Id before a next half AC mains period Th starts.

During a complete degaussing action, the capacitor C3 is slowly charged through the resistor R4 to establish an exponentially rising voltage across the capacitor C3. The voltage across the capacitor C3 adds to the voltage across the resistor R1. In this way, the voltage at the non-inverting input of the second comparator CP2 crosses the second reference voltage Vref2 at a lower degaussing current Id in a next half mains period Th. A decaying degaussing current Id is obtained. It is also possible to replace the capacitor C3 by a resistor and to generate a decaying second reference voltage Vref2 as referred to by the decaying dashed line in FIG. 3. Alternatively, the capacitor C3 and the resistor R4 may be replaced by a short circuit.

After a certain number of half mains periods, the peak value of the degaussing current Id is low enough to allow termination of the degaussing action by opening the switching contacts cs1, cs2 of the relay. The capacitor C3 is discharged within a few seconds, and a new degaussing action may be started.

As a supply current for the control block CB flows through the degaussing coil Ld, also when the Mosfet S1 is open, it is important that the power consumption of the control block CB is as low as possible. This can be accomplished by using C-MOS components.

Due to the current-control mechanism as described above, the degaussing circuit according to the invention performs a degaussing action completely independent of the value and/or frequency of the mains voltage Vac, even when this value or frequency changes momentarily. This applies as long as the AC mains voltage Vac has an amplitude which is large enough to obtain the desired degaussing current Id during a certain half mains period. The shape of the AC mains voltage Vac in a half mains period is not important at all. The degaussing circuit according to the invention is especially suited for display products with a colour CRT which should be suitable for worldwide operation.

Figure 4:
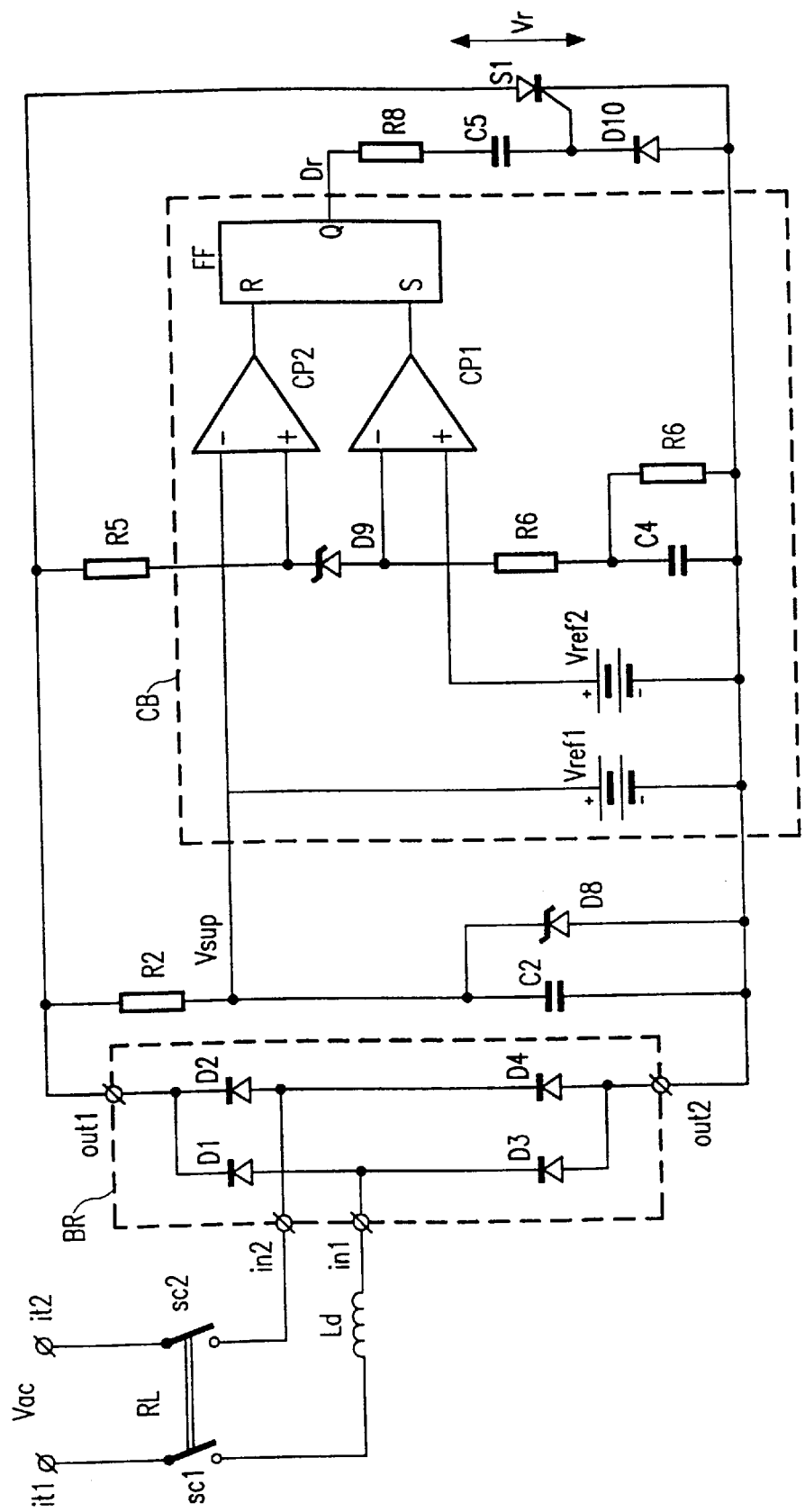
FIG. 4 shows a detailed circuit diagram of a degaussing circuit according to the invention, whereby the AC mains voltage is measured.
Figure 6:
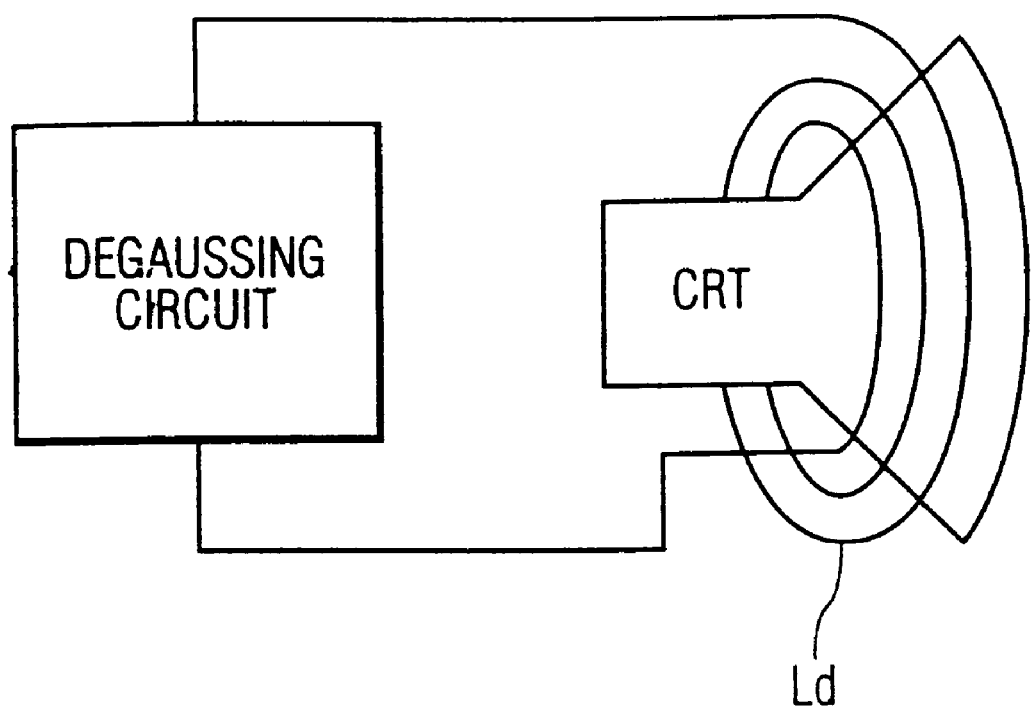
FIG. 6 shows a degassing coil arranged around a CRT.

FIG. 4 shows a detailed circuit diagram of a degaussing circuit according to the invention, whereby the AC mains voltage is measured.

The degaussing circuit has a first and a second input it1, it2 for receiving an AC-mains voltage Vac. A first input in1 of a bridge rectifier BR is connected to the first input it1 via a series arrangement of a first switching contact sc1 of a relay RL and the degaussing coil Ld. A second input in2 of the bridge rectifier BR is connected to the second input it2 via a second switching contact sc2 of the relay RL. The bridge rectifier BR comprises diodes D1 to D4. The bridge rectifier has a first and a second output out1, out2 to supply a rectified AC mains voltage Vr. A main current path of a first switching element S1 is connected between the first and the second output out1, out2 of the bridge rectifier BR. The first switching element S1 is shown as a thyristor. Alternatively, an IGBT, a GTO or a BJT may be used. Further, a series arrangement of a resistor R2 and a zener diode D8 is connected between the first and the second output out1, out2 of the bridge rectifier BR. A smoothing capacitor C2 is connected in parallel with the zener diode D8. A supply voltage Vsup is available at the junction of the resistor R2 and the zener diode D8. Further, a series arrangement of a resistor R5, a zener diode D9, a resistor R6, and a resistor R7 is connected between the first and the second output out1, out2 of the bridge rectifier BR. A capacitor C4 is connected in parallel with the resistor R7.

A first comparator CP1 has an inverting input connected to a junction of the zener diode D9 and the resistor R6, a non-inverting input connected to a second reference voltage source Vref2, and an output connected to a set input S of a flip flop FF. A second comparator CP2 has an inverting input connected to a first reference voltage source Vref1, a non-inverting input connected to a junction of the resistor R5 and the zener diode D9, and an output connected to a reset input R of the flip flop FF. An output Q of the flip flop FF supplies a drive signal Dr to a control input of the first switching element S1 (which is shown as a thyristor) via a series arrangement of a resistor R8 and a capacitor C5. A diode D10 is connected between the control electrode of the thyristor S1 and the second output out2 of the bridge rectifier BR. The control circuit 1 of FIG. 1 comprises the second comparator CP2, the first reference voltage source Vref1, and the flip flop FF. The detecting circuit 2 comprises the first comparator CP1 and the second reference voltage source Vref2. The measuring circuit 3 comprises the resistors R5, R6 and R7, the capacitor C4, and the zener diode D9. A control block CB comprises the control circuit 1, the detecting circuit 2, and the measuring circuit 3.

Figure 5:
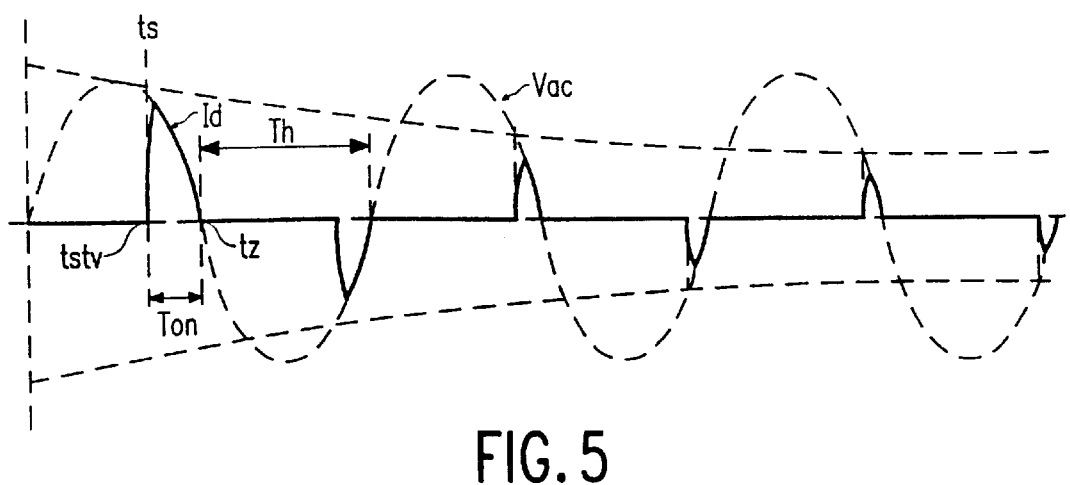
FIG. 5 shows waveforms for explaining the operation of the circuit diagram of FIG. 4.

FIG. 5 shows waveforms for explaining the operation of the circuit diagram of FIG. 4. The dotted sinusoidal waveform represents the AC mains voltage Vac, the dashed lines represent a signal varying in accordance with the time elapsed since the start of a degaussing operation, and the thick line represents the degaussing current Id through the degaussing coil Ld.

The degaussing circuit is activated by closing the first and second switching contacts sc1, sc2 of the relay RL. The rectified AC mains voltage Vr is available across the non-conductive thyristor S1. A small current (a few mA) flows through the resistor R2 to charge the capacitor C2 up to the zener voltage of the zener diode D8 to obtain the supply voltage Vsup for the control block CB. The control block CB is activated when the supply voltage Vsup reaches a suitable value.

The first comparator CP1 compares a tapped-in rectified AC mains voltage Vr with the second reference voltage Vref2. When, during the second half of a half mains period, the AC mains voltage Vac reaches a value that produces the desired peak value of the degaussing current Id, the voltage at the inverting input of the first comparator CP1 crosses the second reference voltage Vref2 and a positive edge is supplied to the set input S of the flip flop FF. The output Q of the flip flop FF is set at a high level and a positive pulse is supplied to the control input of the thyristor S1. The thyristor S1 becomes conducting. In this way a short circuit occurs between the outputs out1, out2 of the bridge rectifier BR, and the AC mains voltage Vac is present across the degaussing coil Ld. Due to the inductance Ld of the degaussing coil Ld, the degaussing current Id rises to a peak value with a time constant T=Ld/Rd, wherein Rd is the resistance of the degaussing coil Ld. The peak value of the degaussing current Id will be somewhat lower than expected at the value of the AC mains voltage at which the thyristor S1 is switched on. The effect of this deviation is negligible at small values of the time constant T.

After the peak value of the degaussing current Id has been reached, the degaussing current Id through the degaussing coil Ld and the thyristor S1 decreases according to Id=Vac/Rd. The effect of the inductance of the degaussing coil Ld is negligible at the slow variation in time of the AC mains voltage Vac. When the AC mains voltage Vac reaches a zero value, the degaussing current Id also reaches a zero value and the thyristor S1 opens.

During the rising edge of the next half mains period Th, the second comparator CP2 detects that the tapped rectified AC mains voltage Vr crosses the first reference voltage Vref1. A positive edge is supplied to the reset input R of the flip flop FF, the output Q of the flip flop FF is set at a low level, and a negative pulse is supplied to the gate of the thyristor S1. The negative pulse is clamped by diode D10. The degaussing circuit is ready for a next half mains period Th. The instant at which the negative pulse is supplied to the control input of the thyristor is not critical as long as it occurs after a zero crossing instant tz of the AC mains voltage Vac which succeeds the instant the thyristor S1 is switched on.

During the complete degaussing action, an exponentially rising voltage is established across the capacitor C4 by slowly charging it through resistors R5, R6 and zener diode D9. This exponentially rising voltage is added to the tapped rectified AC mains voltage Vr available at the non-inverting input of the first comparator CP1. In this way, a lower AC mains voltage Vac is needed to trigger the reset input R of the flip flop FF in a next half mains period. A decaying degaussing current Id is obtained. It is also possible to omit the capacitor C4 and to generate a decaying second reference voltage Vref2 as represented by the decaying dashed line in FIG. 5.

After a certain number of half mains periods Th, the peak value of the degaussing current Id is low enough to allow termination of the degaussing action by opening the switching contacts cs1, cs2 of the relay. The capacitor C4 is discharged within a few seconds, and a new degaussing action may be started.

As a supply current for the control block CB flows through the degaussing coil Ld, also when the thyristor S1 is open, it is important that the power consumption of the control block CB is as low as possible. This can be accomplished by using C-MOS components.

Due to the voltage-control mechanism as described above, the degaussing circuit according to the invention performs a degaussing action substantially independent of the value and/or frequency of the mains voltage Vac, even when this value or frequency changes momentarily. The performance of the degaussing circuit is better as the time constant T=Ld/Rd is smaller. A compromise has to be made as a very small time constant T would imply a very high degaussing current Id. Although the performance of the circuit shown in FIG. 4 is somewhat lower than the performance of the circuit shown in FIG. 2, the circuit of FIG. 4 does not need a second switching element and thus is cheaper. Further, a spurious triggering of the thyristor S1 caused by mains disturbances is very unlikely to occur due to the current-limiting action of the degaussing coil Ld.

While the invention has been described in connection with preferred embodiments, it will be understood that modifications thereof within the principles outlined above will be evident to those skilled in the art and thus the invention is not limited to the preferred embodiments but is intended to encompass such modifications. If a zero crossing of the AC mains voltage has to be detected, the control block CB may monitor the AC mains voltage also at the junction of the degaussing coil and the first switching contact sc1 of the relay RL, because the degaussing current Id is zero in this situation. In FIGS. 2 and 4, a unidirectional switching element S1 is used which is connected to the AC mains voltage Vac via the degaussing coil Ld and a bridge rectifier BR. It is also possible to use a bidirectional switching element S1 (for example a triac) which is directly connected to the AC mains voltage Vac via the degaussing coil Ld, i.e. without a bridge rectifier BR. In this case, a small rectifier is needed to obtain the supply voltage Vsup for the control block.

Any reference signs in the following claims should not be construed as limiting the claims.

We claim:
1. A degaussing circuit comprising:
   a series arrangement of a degaussing coil (Ld) and a switching means (S1), the series arrangement being coupled between input terminals (it1,it2) of the degaussing circuit for receiving an AC mains voltage (Vac), and
   a control means (1) for controlling an on-period (Ton) of the switching means (S1) to generate a degaussing current (Id) through the degaussing coil (Ld), characterized in that the degaussing circuit further comprises:
   measuring means (3) for continuously measuring a value (Ms) representing an actual value of the degaussing current (Id) or the AC mains voltage (Vac), and
   detecting means (2) for detecting a level crossing instant (ts) at which said value (Ms) crosses a predetermined value (Vref2),
   the control means (1) including means to determine a switching instant (tei,tstv) of the switching element (S1) in response to said level crossing instant (ts) for generating a peak value of the degaussing current (Id) related to the actual value of the degaussing current (Id) or the AC mains voltage (Vac) at the level crossing instant (ts).

2. A degaussing circuit as claimed in claim 1, characterized in that said value (Ms) represents the degaussing current (Id), and in that the control means (1) further comprise a voltage detector (CP1) for detecting a zero crossing instant (tz) at which the AC mains voltage (Vac) crosses a zero level, the control means (1) including means to determine a start (tsti) of the on-period (Ton) in response to the zero crossing instant (tz), and an end (tei) of the on-period (Ton) in response to said level crossing instant (ts).

3. A degaussing circuit as claimed in claim 2, characterized in that the degaussing circuit further comprises a bridge rectifier (BR) having inputs (in1,in2) for receiving the AC mains voltage (Vac) via the degaussing coil (Ld), and outputs (out1, out2) coupled across the switching means (S1) for supplying a rectified mains voltage (Vr).

4. A degaussing circuit as claimed in claim 3, characterized in that the measuring means (3) including means to receive said rectified voltage (Vr) across the switching element (S1) for obtaining said value (Ms).

5. A degaussing circuit as claimed in claim 2, characterized in that the degaussing circuit further comprises a measurement resistor (R1) arranged in series with the series arrangement of the degaussing coil (Ld) and the switching means (S1) for obtaining said value (Ms).

6. A degaussing circuit as claimed in claim 2, characterized in that the degaussing circuit comprises
   a further switching element (S2) coupled in parallel with the degaussing coil (Ld), and
   a control circuit (4) for closing the further switching element (S2) at the end (tei) of the on-period (Ton).

7. A degaussing circuit as claimed in claim 6, characterized in that the control circuit (4) for closing the further switching element (S2) is coupled in parallel with the degaussing coil (Ld) to determine the closing of the further switching element (S2) in response to a voltage (Vd) across the degaussing coil (Ld).

8. A degaussing circuit as claimed in claim 1, characterized in that said value (Ms) represents the AC mains voltage (Vac), the control means (1) including means to determine a start (tstv) of the on-period (Ton) in response to said level crossing instant (ts), the first switching means (S1) automatically switching off at a zero crossing instant (tz) of the AC mains voltage (Vac).

9. A degaussing circuit as claimed in claim 1, characterized in that the degaussing circuit further comprises a means (C3;C4) for generating a time value indicative of a time elapsed since a start of a degaussing action, the detection means (2) including means to influence said value (Ms) or the predetermined level (Vref2) for shifting the level crossing instant (ts) in time to obtain a decreasing amplitude of the degaussing current (Id) in successive half periods of the AC mains voltage (Vac).

10. A display apparatus comprising a cathode ray tube (CRT), a degaussing coil (Ld) arranged around the cathode ray tube (CRT), and a degaussing circuit comprising:
   a series arrangement of the degaussing coil (Ld) and a switching means (S1), the series arrangement being coupled between input terminals (it1,it2) of the degaussing circuit for receiving an AC mains voltage (Vac), and
   a control means (1) for controlling an on-period (Ton) of the switching means (S1) to generate a degaussing current (Id) through the degaussing coil (Ld), characterized in that the degaussing circuit further comprises:
   measuring means (3) for continuously measuring a value (Ms) representing an actual value of the degaussing current (Id) or the AC mains voltage (Vac), and
   detecting means (2) for detecting a level crossing instant (ts) at which said value (Ms) crosses a predetermined value (Vref2),
   the control means (1) including means to determine a switching instant (tei,tstv) of the switching element (S1) in response to said level crossing instant (ts) for generating a peak value of the degaussing current (Id) related to the actual value of the degaussing current (Id) or the AC mains voltage (Vac) at the level crossing instant (ts).

11. A method of degaussing, wherein a degaussing coil (Ld) and a switching means (S1) are arranged in series for receiving an AC mains voltage (Vac), the method comprising the step of controlling (1) an on-period (Ton) of the switching means (S1) to generate a degaussing current (Id) through the degaussing coil (Ld), characterized in that the method further comprises the steps of:

continuously measuring (3) a value (Ms) representing an actual value (Ms) of the degaussing current (Id) or the AC mains voltage (Vac), and detecting (2) a level crossing instant (ts) at which said value (Ms) crosses a predetermined value (Vref2), the step of controlling (1) including determining a switching instant (tei,tstv) of the switching element (S1) in response to said level crossing instant (ts) for generating a peak value of the degaussing current (Id) related to the actual value of the degaussing current (Id) or the AC mains voltage (Vac) at the level crossing instant (ts).

* * * * *